(12) United States Patent
Miyazaki et al.

(10) Patent No.: US 11,407,285 B2
(45) Date of Patent: Aug. 9, 2022

(54) VEHICLE COOLING MECHANISM

(71) Applicant: HONDA MOTOR CO., LTD., Tokyo (JP)

(72) Inventors: Toshinobu Miyazaki, Saitama (JP); Satoko Ito, Saitama (JP); Seiji Isotani, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 256 days.

(21) Appl. No.: 16/906,496

(22) Filed: Jun. 19, 2020

(65) Prior Publication Data

US 2020/0398643 A1 Dec. 24, 2020

(30) Foreign Application Priority Data

Jun. 19, 2019 (JP) .............................. JP2019-114067

(51) Int. Cl.
*B60H 1/24* (2006.01)
*B60H 1/00* (2006.01)

(52) U.S. Cl.
CPC ......... *B60H 1/246* (2013.01); *B60H 1/00564* (2013.01)

(58) Field of Classification Search
CPC . B60H 1/246; B60H 1/00564; H01M 10/613; H01M 10/625; H01M 10/6563;
(Continued)

(56) References Cited

U.S. PATENT DOCUMENTS

| 6,332,497 B1* | 12/2001 | Niwa ................. B60H 1/00021 165/204 |
| 2004/0104007 A1* | 6/2004 | Kolb .................. F02B 29/0456 165/41 |

(Continued)

FOREIGN PATENT DOCUMENTS

| JP | 2005-219531 A | 8/2005 |
| JP | 2005-329818 A | 12/2005 |

(Continued)

OTHER PUBLICATIONS

Apr. 13, 2021, Japanese Office Action issued for related JP Application No. 2019-114067.

*Primary Examiner* — Emmanuel E Duke
(74) *Attorney, Agent, or Firm* — Paratus Law Group, PLLC

(57) ABSTRACT

A vehicle cooling mechanism includes a first radiator configured to cool a battery of a vehicle, a second radiator configured to cool a power conversion device that converts electric power supplied from the battery and electric power supplied to the battery, and an air guide duct portion configured to guide outside air from an opening portion provided in a front end portion of the vehicle to the first radiator and the second radiator. The first radiator is arranged above the second radiator. At least a part of the second radiator is arranged so as to overlap the opening portion as viewed from a front side of the vehicle. An upper end portion of the second radiator is positioned above an upper end portion of the opening portion. A lower end portion of the second radiator is positioned below the upper end portion of the opening portion.

9 Claims, 6 Drawing Sheets

(58) Field of Classification Search
CPC .. H01M 10/66; H01M 50/204; H01M 50/249; H01M 2220/20; B60K 11/02; B60K 2001/003; B60K 2001/005; B60K 2001/0438; B60K 1/00; B60K 11/00; B60K 11/08; Y02E 60/10; Y02T 10/70; B60L 58/26

See application file for complete search history.

(56) References Cited

U.S. PATENT DOCUMENTS

| | | | | |
|---|---|---|---|---|
| 2004/0134204 A1* | 7/2004 | Honda | ............... | B60H 1/3205 62/134 |
| 2005/0257563 A1* | 11/2005 | Hoshi | ............... | F28D 1/0443 62/239 |
| 2005/0274507 A1 | 12/2005 | Sanada et al. | | |
| 2006/0278365 A1 | 12/2006 | Sanada et al. | | |
| 2012/0003910 A1* | 1/2012 | Richter | ............... | B60H 1/00385 454/141 |
| 2012/0085510 A1* | 4/2012 | Kim | ............... | B60K 11/04 165/44 |
| 2018/0015839 A1* | 1/2018 | Ito | ............... | B60L 50/64 |

FOREIGN PATENT DOCUMENTS

| | | |
|---|---|---|
| JP | 2006-021749 A | 1/2006 |
| JP | 2006-076380 A | 3/2006 |
| JP | 2006-290063 A | 10/2006 |
| JP | 2011-063168 A | 3/2011 |
| JP | 2015-116877 A | 6/2015 |
| JP | 2017-081213 A | 5/2017 |
| JP | 2019-018680 A | 2/2019 |
| JP | 2019-073135 A | 5/2019 |
| WO | WO 2016/132641 A1 | 8/2016 |

* cited by examiner

VEHICLE COOLING MECHANISM

CROSS-REFERENCE TO RELATED APPLICATIONS

This application is based on and claims priority under 35 USC 119 from Japanese Patent Application No. 2019-114067 filed on Jun. 19, 2019.

TECHNICAL FIELD

The present invention relates to a vehicle cooling mechanism configured to cool a radiator.

BACKGROUND ART

In recent vehicles, a plurality of radiators are arranged in a front room. For example, JP-A-2011-63168 discloses a configuration in which an engine radiator and an inverter radiator are arranged side by side in a left-right direction. JP-A-2006-21749 discloses a configuration in which an electric component radiator for cooling an inverter or the like related to a control of an electric motor is arranged above an air conditioner condenser, and an engine radiator is arranged behind the air conditioner condenser and the electric component radiator. JP-A-2017-81213 discloses that an air conditioner radiator, a drive train radiator, and a fuel cell radiator are arranged in this order from the front.

In a case where a plurality of radiators are arranged in a front room, it is necessary to consider a cooling efficiency of the plurality of radiators, and for that purpose, a positional relationship between the radiators and an opening portion provided in a front end portion of a vehicle is also important.

SUMMARY

An aspect of the present invention provides a vehicle cooling mechanism capable of appropriately cooling a plurality of radiators.

An embodiment of the present invention relates to a vehicle cooling mechanism which includes:

a first radiator configured to cool a battery of a vehicle;

a second radiator configured to cool a power conversion device that converts electric power supplied from the battery and electric power supplied to the battery; and an air guide duct portion configured to guide outside air from an opening portion provided in a front end portion of the vehicle to the first radiator and the second radiator, in which the first radiator is arranged above the second radiator, at least a part of the second radiator is arranged so as to overlap the opening portion as viewed from a front side of the vehicle, an upper end portion of the second radiator is positioned above an upper end portion of the opening portion, and a lower end portion of the second radiator is positioned below the upper end portion of the opening portion.

According to the above embodiment of the present invention, it is possible to appropriately cool the plurality of radiators.

DESCRIPTION OF EMBODIMENTS

Figure 1:
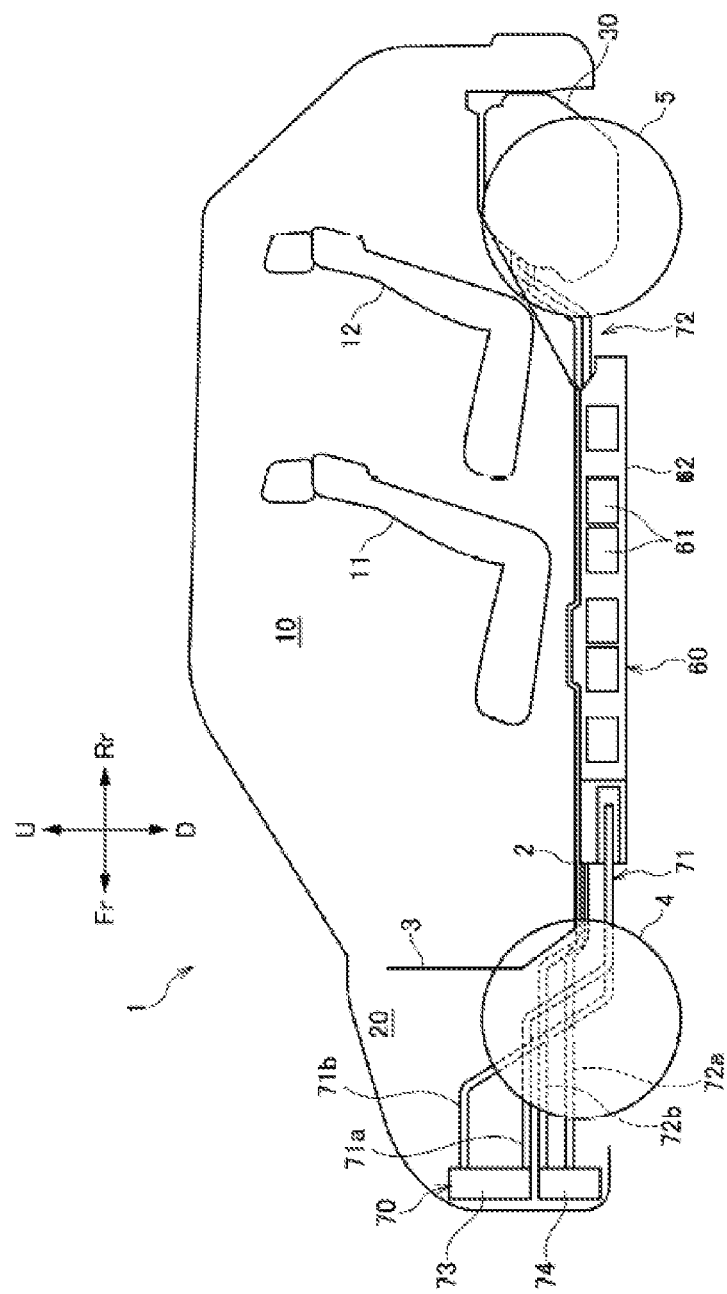
FIG. 1 is a schematic side view showing an overall structure of a vehicle including a vehicle cooling mechanism according to an embodiment of the present invention.

Hereinafter, an embodiment of a vehicle cooling mechanism according to the present invention will be described with reference to the drawings. In the following description, front, rear, left, right, upper and lower directions are described according to a direction viewed from an operator of the vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D, respectively.

[Overall Structure of Vehicle]

First, a vehicle equipped with a vehicle cooling mechanism will be described.

Figure 2:
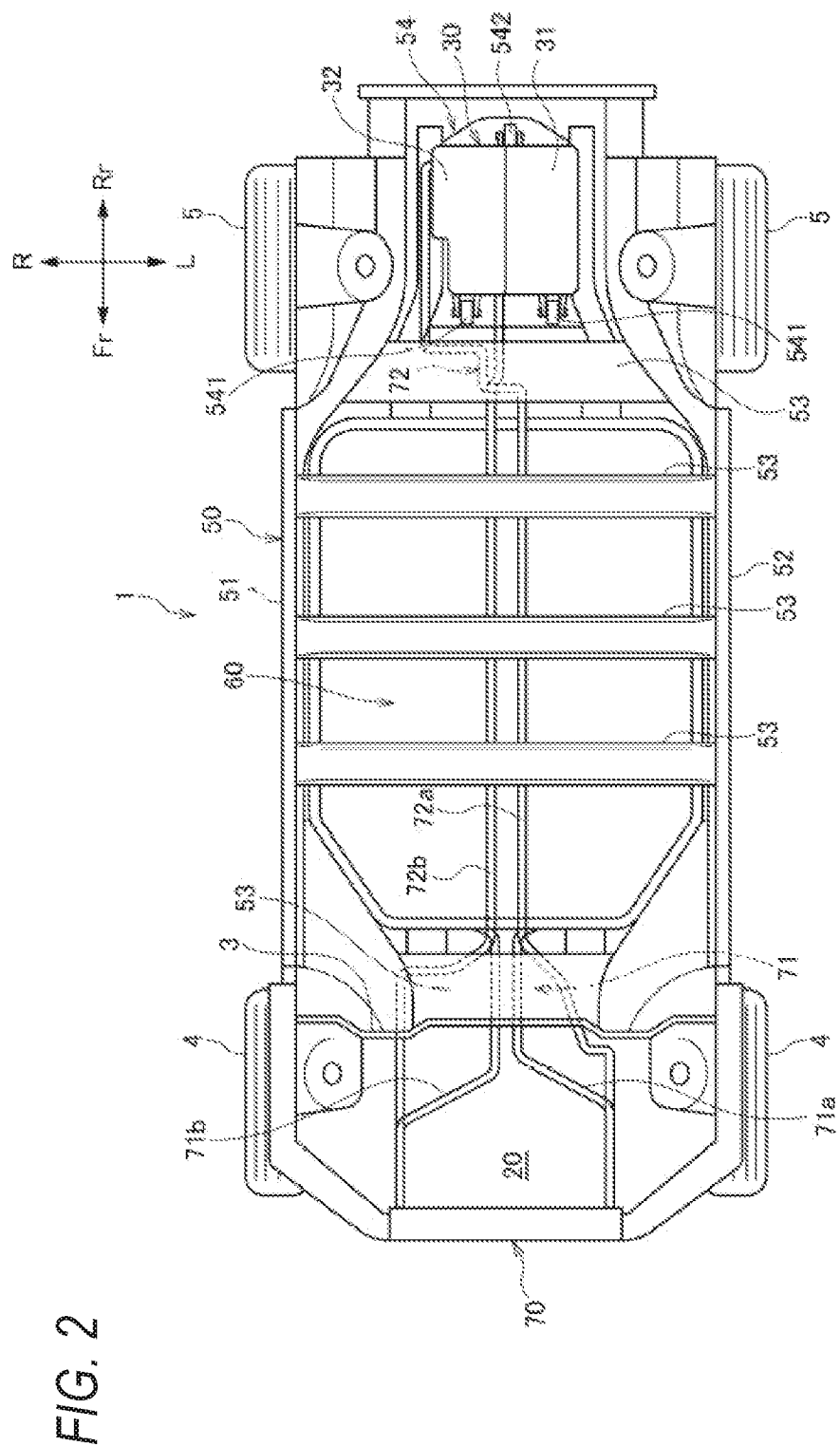
FIG. 2 is a plan view showing an underfloor structure of the vehicle of FIG. 1.

A vehicle 1 shown in FIGS. 1 and 2 is formed by a vehicle interior 10 and a front room 20 in front of the vehicle interior 10, which are defined by a floor panel 2 and a dash panel 3. A front seat 11 and a rear seat 12 are provided in the vehicle interior 10. A driving device unit 30 is provided below the floor panel 2 behind the rear seat 12. The driving device unit 30 drives left and right rear wheels 5. That is, in the vehicle 1, the left and right rear wheels 5 are driving wheels, and left and right front wheels 4 are driven wheels.

A battery 60 including a plurality of battery modules 61 is arranged below the vehicle interior 10. The battery 60 is accommodated in a battery case 62 and is arranged below the floor panel 2.

A vehicle body frame 50 includes a pair of left and right side members 51, 52 extending in a front-rear direction, a plurality of cross members 53 extending in a left-right direction and connecting the side members 51, 52, and a sub-frame 54 having a rectangular shape so as to surround the driving device unit 30. The driving device unit 30 includes a driving device 31 that accommodates a motor MOT as an electric motor, and a power control unit (PCU) 32 as a power conversion device that converts electric power supplied from the battery 60 to the motor MOT and converts electric power supplied from the motor MOT to the battery 60. The PCU 32 is, for example, an inverter. The driving device 31 and the PCU 32 are electrically connected to each other via a bus bar (not shown).

As shown in FIG. 2, the driving device unit 30 is fixed to the sub-frame 54 via a pair of front mounting portions 541, and is fixed to the sub-frame 54 via a rear mounting portion 542. The motor MOT and a transmission (not shown) are provided in the driving device 31, and torque of the motor MOT is transmitted to an output shaft (not shown) via the transmission, and is transmitted from the output shaft (not shown) to the rear wheels 5.

Figure 3:
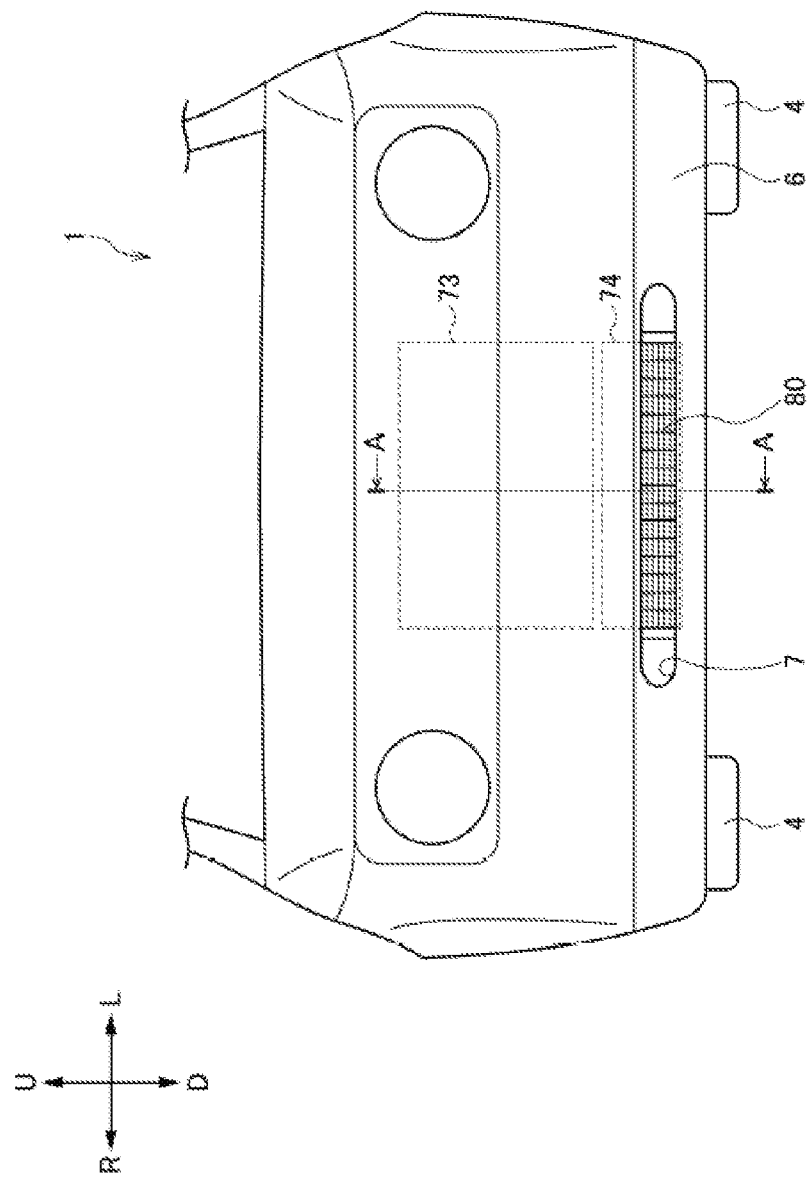
FIG. 3 is a front view of the vehicle of FIG. 1.

As shown in FIG. 3, when the vehicle 1 is viewed from the front, an opening portion 7 for introducing outside air into the front room 20 is provided in a bumper 6 forming a front end portion of the vehicle 1.

(Vehicle Cooling Mechanism)

Hereinafter, the vehicle cooling mechanism (hereinafter, referred to as a cooling mechanism 70) of the present invention will be described.

Figure 4:
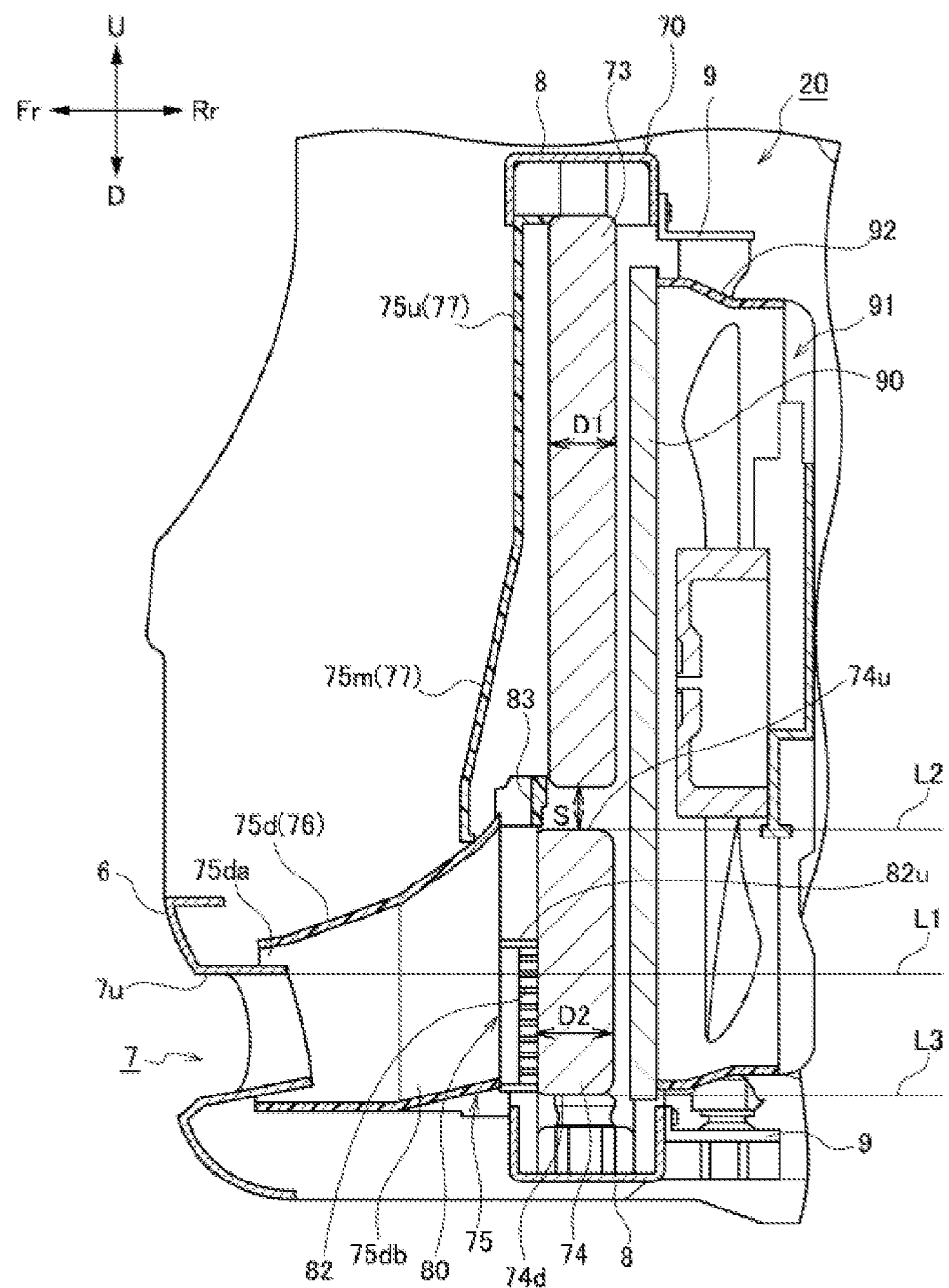
FIG. 4 is a sectional view taken along a line A-A of FIG. 3.

As shown in FIGS. 1 and 4, the cooling mechanism 70 for cooling the battery 60 and the PCU 32 is provided at a front portion of the front room 20. The cooling mechanism 70 includes a first radiator 73 for cooling the battery 60, a second radiator 74 for cooling the PCU 32, and an air guide duct portion 75 for guiding outside air from the opening portion 7 provided in the bumper 6 to the first radiator 73 and the second radiator 74.

The first radiator 73 and the battery 60 are connected by a first cooling pipe 71. The first cooling pipe 71 is connected to the first radiator 73 from a front portion of the battery case 62 through the front room 20. The first cooling pipe 71 includes a first refrigerant supply pipe 71a for supplying a refrigerant from the first radiator 73 to the battery 60, and a first refrigerant discharge pipe 71b for discharging the refrigerant from the battery 60 to the first radiator 73.

The second radiator 74 and the PCU 32 are connected by a second cooling pipe 72. The second cooling pipe 72 extends from the PCU 32 in the front-rear direction of the vehicle through a gap between the floor panel 2 and the battery 60 (the battery case 62), and is further connected to the second radiator 74 through the front room 20. The second cooling pipe 72 includes a second refrigerant supply pipe 72a for supplying a refrigerant from the second radiator 74 to the PCU 32, and a second refrigerant discharge pipe 72b for discharging the refrigerant from the PCU 32 to the cooling mechanism 70. By arranging the second cooling pipe 72 extending from the front room 20 of the vehicle to the rear of the rear seat 12 in the gap between the floor panel 2 and the battery 60, the second cooling pipe 72 can be protected from flying stones or the like.

The first radiator 73 and the second radiator 74 are fixed side by side in an upper-lower direction inside a rectangular bulkhead 8, which is a vehicle frame member positioned at the front portion of the front room 20. More specifically, the first radiator 73 is arranged above the second radiator 74 and is arranged so as to overlap the second radiator 74 in the front-rear direction as viewed from a side of the vehicle 1. Therefore, the first radiator 73 and the second radiator 74 can be compactly arranged in the front room 20 of the vehicle 1 in the front-rear direction.

Referring also to FIG. 3, at least a part of the second radiator 74 is arranged so as to overlap the opening portion 7 as viewed from a front side of the vehicle 1, an upper end portion 74u of the second radiator 74 is positioned above an upper end portion 7u of the opening portion 7, and a lower end portion 74d of the second radiator 74 is positioned below the upper end portion 7u of the opening portion 7. That is, as shown in FIG. 4, a first imaginary line L1 extending horizontally through the upper end portion 7u of the opening portion 7 is positioned between a second imaginary line L2 extending horizontally through the upper end portion 74u of the second radiator 74 and a third imaginary line L3 extending horizontally through the lower end portion 74d of the second radiator 74.

The air guide duct portion 75 includes a lower duct portion 75d that extends in a tubular shape from the opening portion 7 side toward the second radiator 74 side, an intermediate duct portion 75m having a smaller air guide area from a lower side toward an upper side, and an upper duct portion 75u facing the first radiator 73. In the present embodiment, the lower duct portion 75d is configured by a first air guide duct 76, and the intermediate duct portion 75m and the upper duct portion 75u are configured by a second air guide duct 77, but these may be configured by one duct. In addition, the lower duct portion 75d (the first air guide duct 76) may be integrally formed with the bumper 6.

Figure 5:
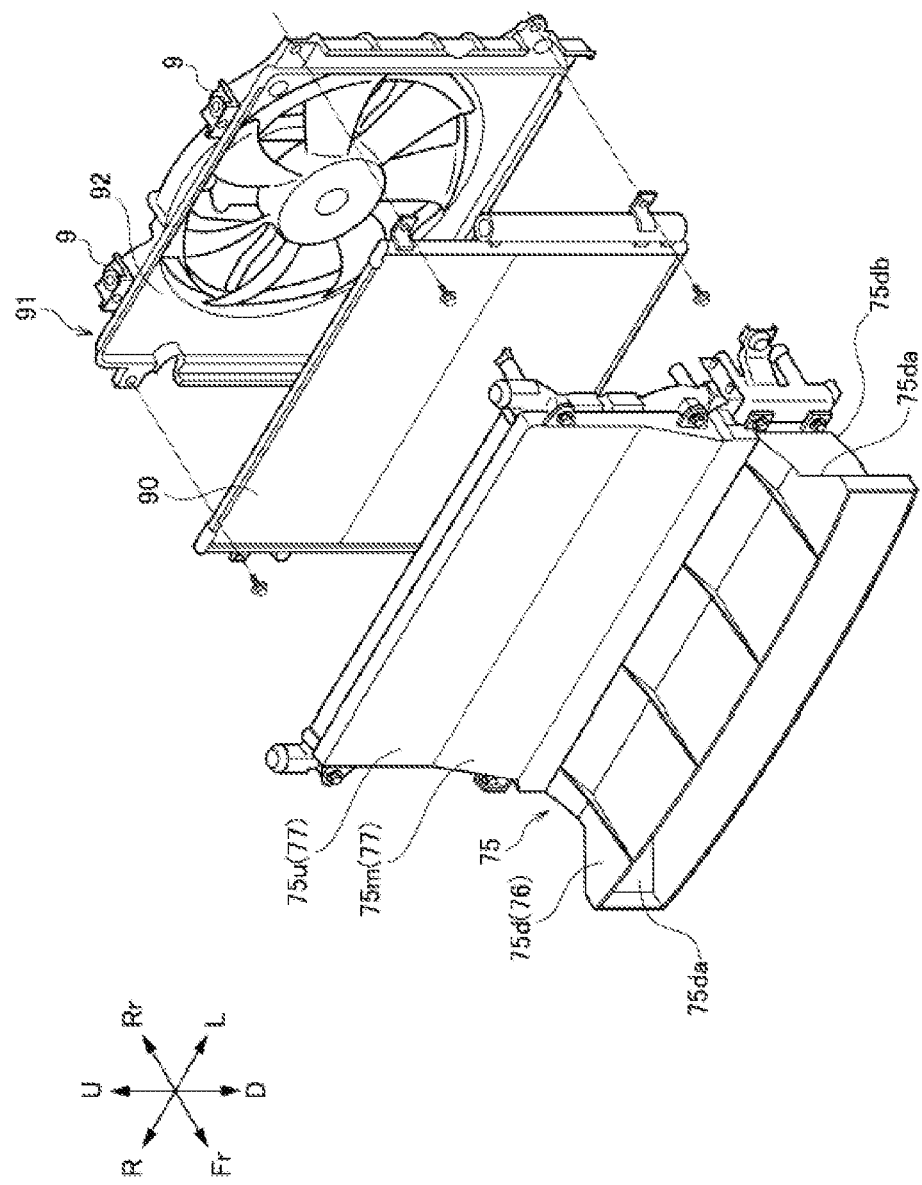
FIG. 5 is an exploded perspective view of the vehicle cooling mechanism according to the embodiment of the present invention.
Figure 6:
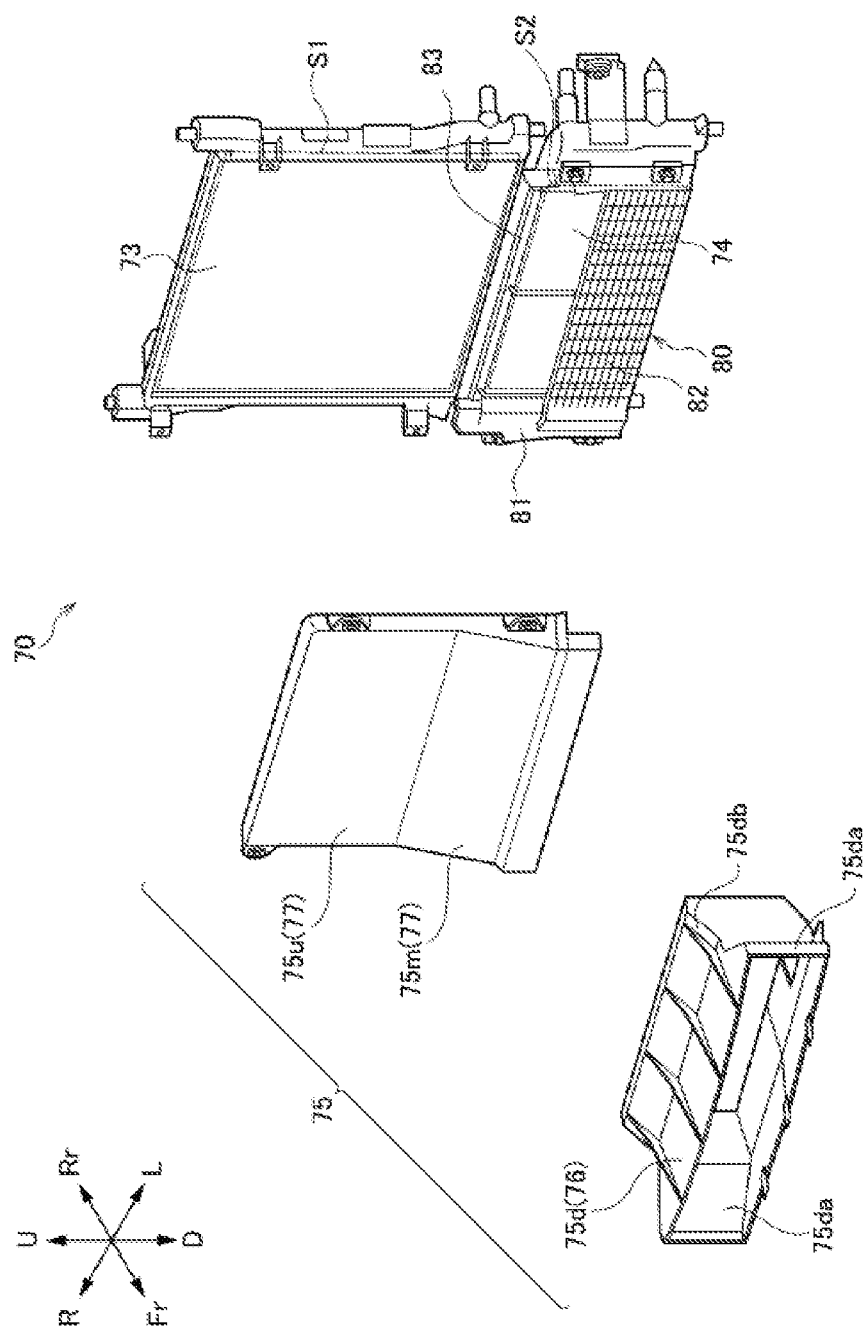
FIG. 6 is an exploded perspective view of a radiator unit of the vehicle cooling mechanism of FIG. 5.

As shown in FIGS. 4 to 6, a front end portion of the lower duct portion 75d is formed with a widened portion 75da such that a distance in a vehicle width direction is gradually increased toward the front side, and a rear end portion of the lower duct portion 75d is formed with a rear inclined portion 75db that is formed slightly upward as it goes rearward.

The intermediate duct portion 75m and the upper duct portion 75u face the first radiator 73 and have a substantially U-shaped cross section that forms a flow path, and a lower end portion of the intermediate duct portion 75m is configured to cover an upper end portion (an upper end portion of the lower duct portion 75d) of the first air guide duct 76 as viewed from the front side of the vehicle 1. The second air guide duct 77 is configured such that a flow path area becomes smaller toward the upper side. As a result, a flow velocity of a fluid flowing inside the second air guide duct 77 is increased, outside air can be spread to an upper portion of the upper duct portion 75u, and backflow can be prevented.

A guard member 80 is provided in front of the second radiator 74. The guard member 80 is fixed to the second radiator 74 and is positioned behind the lower duct portion 75d. The guard member 80 includes a rectangular frame body 81, a guard portion 82 in which a plurality of bar members are arranged in a lattice shape inside the frame body 81, and a windbreak portion 83 that covers a gap S between the first radiator 73 and the second radiator 74 in the upper-lower direction. The guard portion 82 is formed so as to cover at least an area of a front surface of the second radiator 74 that is visible from the opening portion 7. Since the guard member 80 is arranged in front of the second radiator 74 in this manner, the second radiator 74 can be prevented from being damaged by a foreign matter that has entered through the opening portion 7. In addition, the windbreak portion 83 of the guard member 80 can prevent outside air supplied from the opening portion 7 from passing through the gap S between the first radiator 73 and the second radiator 74. Further, the number of components can be reduced by providing the windbreak portion 83 on the guard member 80 that protects the second radiator 74.

In the present embodiment, an upper frame portion forming the frame body 81 also serves as the windbreak portion 83. It is preferable that an upper end portion 82u of the guard portion 82 is at the same height as the upper end portion 7u of the opening portion 7, or is higher than the upper end portion 7u of the opening portion 7 and lower than the upper end portion 74u of the second radiator 74. As a result, it is possible to suppress an increase in a size of the guard portion 82 while suppressing damage to the second radiator 74.

Behind the first radiator 73 and the second radiator 74, an air conditioner condenser 90 and a shroud fan 91 that is arranged further rearward of the air conditioner condenser 90 and arranged so as to straddle the first radiator 73 and the second radiator 74 in the upper-lower direction are provided. By driving the shroud fan 91, outside air can be taken into the air guide duct portion 75 during not only traveling but also stopping of the vehicle 1. In addition, since the air conditioner condenser 90 has a higher management temperature than the first radiator 73 and the second radiator 74, cooling efficiency can be optimized by arranging the air conditioner condenser 90 behind the first radiator 73 and the second radiator 74.

The air conditioner condenser 90 is fixed to a shroud 92 of the shroud fan 91, and the shroud 92 is fixed to the bulkhead 8 (a vehicle body) via a bracket 9. Therefore, the air conditioner condenser 90 and the shroud fan 91 can be unitized, and ease of assembly when the air conditioner condenser 90 and the shroud fan 91 are fixed to the vehicle body is improved.

In the cooling mechanism 70 configured as described above, outside air is introduced from the opening portion 7 provided in the bumper 6 during traveling. The outside air introduced from the opening portion 7 is supplied to the second radiator 74 arranged so as to overlap the opening portion 7 via the lower duct portion 75d (the first air guide duct 76). At this time, the upper end portion 74u of the second radiator 74 is positioned above the upper end portion 7u of the opening portion 7, and the lower end portion 74d of the second radiator 74 is positioned below the upper end portion 7u of the opening portion 7, so that the second radiator 74 can be more effectively cooled without obstructing a natural flow of outside air. Therefore, when the second radiator 74 for cooling the PCU 32 is required to have a cooling capacity higher than the first radiator 73 for cooling the battery 60, the second radiator 74 can be cooled more effectively by the outside air taken in from the opening portion 7 during traveling.

A part of the outside air taken in from the opening portion 7 is guided to the first radiator 73 by the intermediate duct portion 75m and the upper duct portion 75u (the second air guide duct 77). Since the gap S between the first radiator 73 and the second radiator 74 is covered by the windbreak portion 83 of the guard member 80, outside air is appropriately introduced from the first air guide duct 76 to the second air guide duct 77. In addition, since the intermediate duct portion 75m is configured such that the flow path area becomes smaller from the lower side to the upper side, the outside air can be guided to an upper end portion of the first radiator 73.

Even if foreign matter such as pebbles enters the lower duct portion 75d (the first air guide duct 76) from the opening portion 7, the guard portion 82 of the guard member 80 is arranged so as to cover the area of the front surface of the second radiator 74 that is visible from the opening portion 7, so that the second radiator 74 can be prevented from being damaged.

A cooling capacity of the first radiator 73 arranged above the second radiator 74 is lower than that of the second radiator 74 that overlaps the opening portion 7. Therefore, a decrease in the cooling capacity of the first radiator can be suppressed by making an area S1 of the first radiator 73 larger than an area S2 of the second radiator 74. Meanwhile, a width D2 of the second radiator 74 in the front-rear direction is larger than a width D1 of the first radiator 73 in the front-rear direction. This improves the cooling capacity of the second radiator 74.

The outside air that has passed through the first radiator 73 and the second radiator 74 exchanges heat with the air conditioner condenser 90 arranged behind the first radiator 73 and the second radiator 74, and then is discharged from the shroud fan 91.

Although the embodiment of the present invention has been described above, the present invention is not limited to the above-described embodiment, and modifications, improvements, or the like can be made as appropriate.

For example, although the cooling mechanism 70 including the two radiators of the first radiator 73 and the second radiator 74 has been illustrated in the above-described embodiment, the present invention is not limited thereto, and another radiator may be provided.

At least the following matters are described in the present description. Although the corresponding constituent elements or the like in the above-described embodiment are shown in parentheses, the present invention is not limited thereto.

(1) A vehicle cooling mechanism (cooling mechanism 70) includes:

a first radiator (first radiator 73) configured to cool a battery (battery 60) of a vehicle (vehicle 1);

a second radiator (second radiator 74) configured to cool a power conversion device (PCU 32) that converts electric power supplied from the battery and electric power supplied to the battery; and an air guide duct portion (air guide duct portion 75) configured to guide outside air from an opening portion (opening portion 7) provided in a front end portion (bumper 6) of the vehicle to the first radiator and the second radiator, in which the first radiator is arranged above the second radiator, at least a part of the second radiator is arranged so as to overlap the opening portion as viewed from a front side of the vehicle, an upper end portion (upper end portion 74u) of the second radiator is positioned above an upper end portion (upper end portion 7u) of the opening portion, and a lower end portion (lower end portion 74d) of the second radiator is positioned below the upper end portion of the opening portion.

During traveling of the vehicle, the second radiator for cooling the power conversion device is required to have a higher cooling capacity than the first radiator for cooling the battery. According to (1), at least a part of the second radiator is arranged so as to overlap the opening portion, the upper end portion of the second radiator is positioned above the upper end portion of the opening portion, and the lower end portion of the second radiator is positioned below the upper end portion of the opening portion, so that the second radiator can be cooled more effectively by the outside air taken in from the opening portion during traveling.

In addition, the outside air taken in from the opening portion is guided to the second radiator by the air guide duct portion, and a part of the outside air is guided to the first radiator, so that the first radiator and the second radiator can be appropriately cooled.

(2) In the vehicle cooling mechanism according to (1), an area (area S1) of the first radiator is larger than an area (area S2) of the second radiator as viewed from the front side of the vehicle.

According to (2), the cooling capacity of the first radiator arranged above the second radiator is lower than that of the second radiator that overlaps the opening portion, and the decrease in the cooling capacity of the first radiator can be suppressed by making the area of the first radiator larger than the area of the second radiator.

(3) In the vehicle cooling mechanism according to (2), a width (width D2) of the second radiator in a front-rear direction is larger than a width (width D1) of the first radiator in the front-rear direction.

According to (3), the cooling capacity of the second radiator is improved by increasing a thickness of the second radiator (the width in the front-rear direction) by an amount that the area of the second radiator is smaller than the area of the first radiator.

(4) In the vehicle cooling mechanism according to any one of (1) to (3), the air guide duct portion includes
a lower duct portion (lower duct portion 75*d*) extending in a tubular shape from an opening portion side toward a second radiator side,
an intermediate duct portion (intermediate duct portion 75*m*), whose air guide area decreases from a lower side toward an upper side, positioned above the lower duct portion, and
an upper duct portion (upper duct portion 75*u*) positioned above the intermediate duct portion and facing the first radiator.

According to (4), outside air taken in from the opening portion is guided to the second radiator by the lower duct portion extending in the tubular shape from the opening portion side toward the second radiator side. In addition, a part of the outside air taken in from the opening portion by the intermediate duct portion and the upper duct portion is guided to the first radiator. At this time, since the air guide area of the intermediate duct portion becomes smaller from the lower side toward the upper side, the flow velocity of the fluid flowing inside is increased, and outside air can be spread to the upper portion of the upper duct portion, and the backflow can be prevented.

(5) In the vehicle cooling mechanism according to any one of (1) to (4),
the first radiator and the second radiator are arranged so as to overlap each other in the front-rear direction as viewed from a side of the vehicle.

According to (5), since the first radiator and the second radiator are arranged so as to overlap each other in the front-rear direction as viewed from the side of the vehicle, the first radiator and the second radiator can be compactly arranged in the front room of the vehicle in the front-rear direction.

(6) In the vehicle cooling mechanism according to any one of (1) to (5),
a guard member (guard member 80) is provided in front of the second radiator, and
the guard member includes a windbreak portion (windbreak portion 83) covering a gap (gap S) between the first radiator and the second radiator in an upper-lower direction.

According to (6), since the guard member is arranged in front of the second radiator, the second radiator can be prevented from being damaged by the foreign matter that has entered through the opening portion. In addition, the windbreak portion of the guard member can prevent outside air supplied from the opening portion from passing through the gap between the first radiator and the second radiator. Further, the number of components can be reduced by providing the windbreak portion on the guard member that protects the second radiator.

(7) In the vehicle cooling mechanism according to (6),
the guard member includes a frame body (frame body 81) and a guard portion (guard portion 82) in which a bar member is arranged in a lattice shape inside the frame body, and
an upper end portion (upper end portion 82*u*) of the guard portion is at the same height as the upper end portion of the opening portion, or is higher than the upper end portion of the opening portion and lower than the upper end portion of the second radiator.

According to (7), since the upper end portion of the guard portion is at the same height as the upper end portion of the opening portion, or is higher than the upper end portion of the opening portion and lower than the upper end portion of the second radiator, it is possible to suppress an increase in a size of the guard portion of the guard member while suppressing damage to the second radiator.

(8) In the vehicle cooling mechanism according to any one of (1) to (7),
an air conditioner condenser (air conditioner condenser 90) and a fan (shroud fan 91) that is arranged further rearward of the air conditioner condenser and arranged so as to straddle the first radiator and the second radiator in the upper-lower direction are provided behind the first radiator and the second radiator.

According to (8), behind the first radiator and the second radiator, the air conditioner condenser and the fan are provided, and the fan is arranged so as to straddle the first radiator and the second radiator in the upper-lower direction, so that one fan can supply outside air to the first radiator, the second radiator, and the air conditioner condenser even when the vehicle is stopped. In addition, since the air conditioner condenser has the higher management temperature than the first radiator and the second radiator, the cooling efficiency can be optimized by arranging the air conditioner condenser behind the first radiator and the second radiator.

(9) In the vehicle cooling mechanism according to (8),
the fan is a shroud fan including a shroud (shroud 92),
the air conditioner condenser is fixed to the shroud, and
the shroud is fixed to a vehicle body (bulkhead 8).

According to (9), the air conditioner condenser and the shroud fan can be unitized, and the ease of assembly when the air conditioner condenser and the shroud fan are fixed to the vehicle body is improved.

The invention claimed is:

1. A vehicle cooling mechanism comprising:
a first radiator configured to cool a battery of a vehicle;
a second radiator configured to cool a power conversion device that converts electric power supplied from the battery and electric power supplied to the battery; and
an air guide duct portion configured to guide outside air from an opening portion provided in a front end portion of the vehicle to the first radiator and the second radiator,
wherein the first radiator is arranged above the second radiator,
wherein at least a part of the second radiator is arranged so as to overlap the opening portion as viewed from a front side of the vehicle,
wherein an upper end portion of the second radiator is positioned above an upper end portion of the opening portion, and
wherein a lower end portion of the second radiator is positioned below the upper end portion of the opening portion.

2. The vehicle cooling mechanism according to claim 1, wherein an area of the first radiator is larger than an area of the second radiator as viewed from the front side of the vehicle.

3. The vehicle cooling mechanism according to claim 2, wherein a width of the second radiator in a front-rear direction is larger than a width of the first radiator in the front-rear direction.

4. The vehicle cooling mechanism according to claim 1, wherein the air guide duct portion includes
a lower duct portion extending in a tubular shape from an opening portion side toward a second radiator side,
an intermediate duct portion, whose air guide area decreases from a lower side toward an upper side, positioned above the lower duct portion, and an upper duct portion positioned above the intermediate duct portion and facing the first radiator.

5. The vehicle cooling mechanism according to claim 1, wherein the first radiator and the second radiator are arranged so as to overlap each other in the front-rear direction as viewed from a side of the vehicle.

6. The vehicle cooling mechanism according to claim 1, wherein a guard member is provided in front of the second radiator, and
wherein the guard member includes a windbreak portion covering a gap between the first radiator and the second radiator in an upper-lower direction.

7. The vehicle cooling mechanism according to claim 6, wherein the guard member includes a frame body and a guard portion in which a bar member is arranged in a lattice shape inside the frame body, and
wherein an upper end portion of the guard portion is at the same height as the upper end portion of the opening portion, or is higher than the upper end portion of the opening portion and lower than the upper end portion of the second radiator.

8. The vehicle cooling mechanism according to claim 1, wherein an air conditioner condenser and a fan that is arranged further rearward of the air conditioner condenser and arranged so as to straddle the first radiator and the second radiator in the upper-lower direction are provided behind the first radiator and the second radiator.

9. The vehicle cooling mechanism according to claim 8, wherein the fan is a shroud fan including a shroud,
wherein the air conditioner condenser is fixed to the shroud, and
wherein the shroud is fixed to a vehicle body.

* * * * *